(12) United States Patent
Papin et al.

(10) Patent No.: US 8,740,556 B2
(45) Date of Patent: Jun. 3, 2014

(54) STRUCTURAL AND AERODYNAMIC MODULE FOR A TURBOMACHINE CASING AND CASING STRUCTURE COMPRISING A PLURALITY OF SUCH A MODULE

(75) Inventors: Thierry Georges Paul Papin, Varennes-Jarcy (FR); Alain Raffy, Yerres (FR); Dominique Raulin, Saint Fargeau Ponthierry (FR)

(73) Assignee: SNECMA, Paris (FR)

( * ) Notice: Subject to any disclaimer, the term of this patent is extended or adjusted under 35 U.S.C. 154(b) by 531 days.

(21) Appl. No.: 13/031,893

(22) Filed: Feb. 22, 2011

(65) Prior Publication Data
US 2011/0229326 A1 Sep. 22, 2011

(30) Foreign Application Priority Data
Feb. 26, 2010 (FR) ...................................... 10 51373

(51) Int. Cl.
*F01D 9/04* (2006.01)
(52) U.S. Cl.
USPC ...................... 415/189; 415/209.3; 415/209.4; 415/210.1
(58) Field of Classification Search
USPC .................. 415/189–190, 209.2–209.4, 210.1
See application file for complete search history.

(56) References Cited

U.S. PATENT DOCUMENTS

| 5,320,490 | A | 6/1994 | Corbin et al. |
| 5,740,674 | A | 4/1998 | Beutin et al. |
| 6,200,092 | B1 | 3/2001 | Koschier |
| 6,676,373 | B2 | 1/2004 | Marlin et al. |
| 7,114,917 | B2 | 10/2006 | Legg |

FOREIGN PATENT DOCUMENTS

| CH | 398 645 A | 3/1966 | |
| EP | 0 761 931 A1 | 3/1997 | |
| EP | 1 087 103 A2 | 3/2001 | |
| EP | 1 087 103 A3 | 3/2001 | |
| FR | 2 685 383 A1 | 6/1993 | |
| FR | 2933130 A1 * | 1/2010 | ............... F16M 5/00 |
| GB | 2 121 115 A | 12/1983 | |
| SE | WO2008121047 A1 * | 10/2008 | ............... F01D 9/04 |
| WO | WO 2008/121047 A1 | 10/2008 | |
| WO | WO 2010/004216 A1 | 1/2010 | |
| WO | WO 2010/007220 A2 | 1/2010 | |
| WO | WO 2010/007220 A3 | 1/2010 | |

OTHER PUBLICATIONS

French Preliminary Search Report issued on Oct. 15, 2010 in corresponding French Application No. 1051373 (with an English Translation of Categories).

* cited by examiner

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

A structural and aerodynamic module including two blades each extending along a longitudinal axis, in which each blade includes a leading edge, a trailing edge, a radially inner edge, and a radially outer edge, is provided. The module also includes a radially inner platform mechanically connecting the radially inner edges of the two blades, and a radially outer platform mechanically connecting the radially outer edges of the two blades such that the two blades and the radially outer and inner platforms delimit a flow stream. The two blades and the platforms are made from a composite material and the two blades are fixed on the radially outer and inner platforms using screw-nut assemblies.

13 Claims, 6 Drawing Sheets

STRUCTURAL AND AERODYNAMIC MODULE FOR A TURBOMACHINE CASING AND CASING STRUCTURE COMPRISING A PLURALITY OF SUCH A MODULE

TECHNICAL FIELD AND BACKGROUND OF THE INVENTION

The present invention relates to a structural and aerodynamic module of a turbomachine casing, for example an intermediate casing of a dual-flow turbine engine for an airplane, to a casing structure comprising a plurality of such a module, and to a turbomachine comprising at least one such casing.

A turbojet engine traditionally comprises, from upstream to downstream, a low-pressure compressor or fan, a high-pressure compressor, a combustion chamber, a high-pressure turbine, and a low-pressure turbine.

Moreover, the turbojet engine comprises an outer casing, an inner casing, and an intermediate casing concentric to the first two casings and dividing the space delimited between the outer and inner casings into a primary stream allocated to the compression, then expansion of the propulsion gases, and a secondary stream in which the secondary air circulates.

The intermediate casing performs a structural function by connecting the inner hub to the outer shroud and being able to support loads during operation. To that end, the intermediate casing comprises rigid radial arms connecting the inner hub to the outer shroud. The shape of the radial arms is determined so that its aerodynamic impact on the flow is as limited as possible.

An aerodynamic flow stationary guide vane in the axis of the engine is also provided. This stationary guide vane is made up of a plurality of stationary vanes, which are called outlet guide vanes (OGV).

In traditional turbojet engines, the flow stationary guide vane or cascade vane is separate from the intermediate casing and is situated upstream thereof. However, it is desirable to reduce the mass of turbojet engines and, as a result, the mass of the elements making them up.

To that end, in the turbojet engines under development, it is provided to combine the intermediate casing and the flow stationary guide vane in order to eliminate a certain number of parts. As a result, the vanes are such that they serve the structural function of radial arms.

Vanes made from a metal material make it possible to perform that function. However, they have a high mass.

Document FR 2 685 383 describes an intermediate casing of a turbomachine comprising structural arms comprising an elongated element made from a composite material and fastening fittings for fastening said elongated element to the inner hub and the outer shroud. The elongated body is made by draping several layers of fibers and comprises a recess filled with support fibers in the longitudinal direction of the arm.

The metal fittings are arranged in the four corners of the elongated element and are fixed thereon by screws and nuts. This type of casing is satisfactory from a structural perspective, but it is complex to produce because it comprises four fittings per structural arm, which multiplies the fastening of each of the arms on the inner hub and the outer shroud. Moreover, the mass of the fittings is non-negligible.

BRIEF DESCRIPTION OF THE INVENTION

It is consequently one aim of the present invention to offer an intermediate casing element for a turbomachine having a reduced mass and simpler production.

The previously stated aim is achieved by a sub-assembly made up of two blades made from a composite material connected at their outer and inner radial ends by platforms, at least one of which is also made from a composite material, the blades being mechanically connected to the platforms by screw-nut assemblies under shearing stress and allowing the sub-assemblies thus formed to bear the traction-compression stresses to which the radial arms of an intermediate casing are traditionally subjected. The blades comprise a curved shape to rectify the secondary flow.

In other words, pairs of vanes are made from a composite material to produce an intermediate casing serving both the traditional structural function of an intermediate casing and the traditional aerodynamic function of a flow stationary guide vane.

Aside from the significant mass savings, the production of casings is simplified and the replacement of blades in case of deterioration is simplified. Indeed, removing and replacing a module can be done directly under the wing of the aircraft without having to take out the turbojet engine. This therefore makes it possible to save considerable time during maintenance.

Particularly advantageously, a casing structure is made comprising subassemblies angularly distributed around the axis of the structure and metal vanes arranged at 6:00 and 12:00 intended to recover the efforts therefrom in terms of the suspension as well as the transmission of efforts coming from the hub.

The present invention then primarily relates to a module for producing a turbomachine casing comprising two blades each extending along a longitudinal axis, each blade each comprising a leading edge, a trailing edge, a radially inner edge and a radially outer edge, the radially outer and radially inner edges of the blades having a curved profile, said blades comprising bores for passage of screws, the module also comprising a radially inner platform mechanically connecting the radially inner edges of the two blades, and a radially outer platform mechanically connecting the radially outer edges of the two blades such that the two blades and the radially outer and inner platforms delimit a flow stream, the two blades and at least one of the platforms being made from a composite material and the two blades being fixed on the radially outer and inner platforms using screw-nut assemblies.

The axis of the screws is advantageously substantially orthogonal to the longitudinal axes of the blades.

The blades and at least one of the platforms can be made from fibers woven in three dimensions.

The present invention also relates to a platform for making a module according to the present invention, intended to connect two blades at their radially outer edges or their radially inner edges, the edges being fixed on the platform by screw-nut assemblies, the platform being made from a composite material.

Advantageously, the radially outer face of the radially inner platform recreates a flow stream.

The lateral edges of the platforms in contact with the blade faces preferably have a profile corresponding to that of the faces of the blades.

The present invention also relates to a structure comprising a plurality of modules according to the present invention, arranged angularly on an inner hub.

The modules are advantageously arranged relative to each other such that the distance between two blades of two adjacent modules is substantially equal to that between two blades of a same module.

The structure according to the present invention advantageously comprises a first group of at least one metal vane in angular position at twelve o'clock and a second group of at least one metal vane in angular position at six o'clock, the modules according to the invention being arranged between these two groups of metal vanes. The metal vanes are advantageously made from titanium.

The structure can comprise radially inner aerodynamic panels and radially outer aerodynamic panels arranged between each pair of modules so as to recreate the flow streams.

The structure can also comprise second aerodynamic panels arranged between each pair of metal vanes between two radially outer platforms.

The present invention also relates to a turbomachine comprising such a casing structure according to the present invention.

The turbomachine can form a dual-flow turbojet engine, wherein the casing structure forms an intermediate casing fixed on an inner hub and on an outer shroud.

BRIEF DESCRIPTION OF THE DRAWINGS

The present invention will be better understood using the following description and the appended drawings, in which.

DETAILED DESCRIPTION OF SPECIFIC EMBODIMENTS

Figure 1:
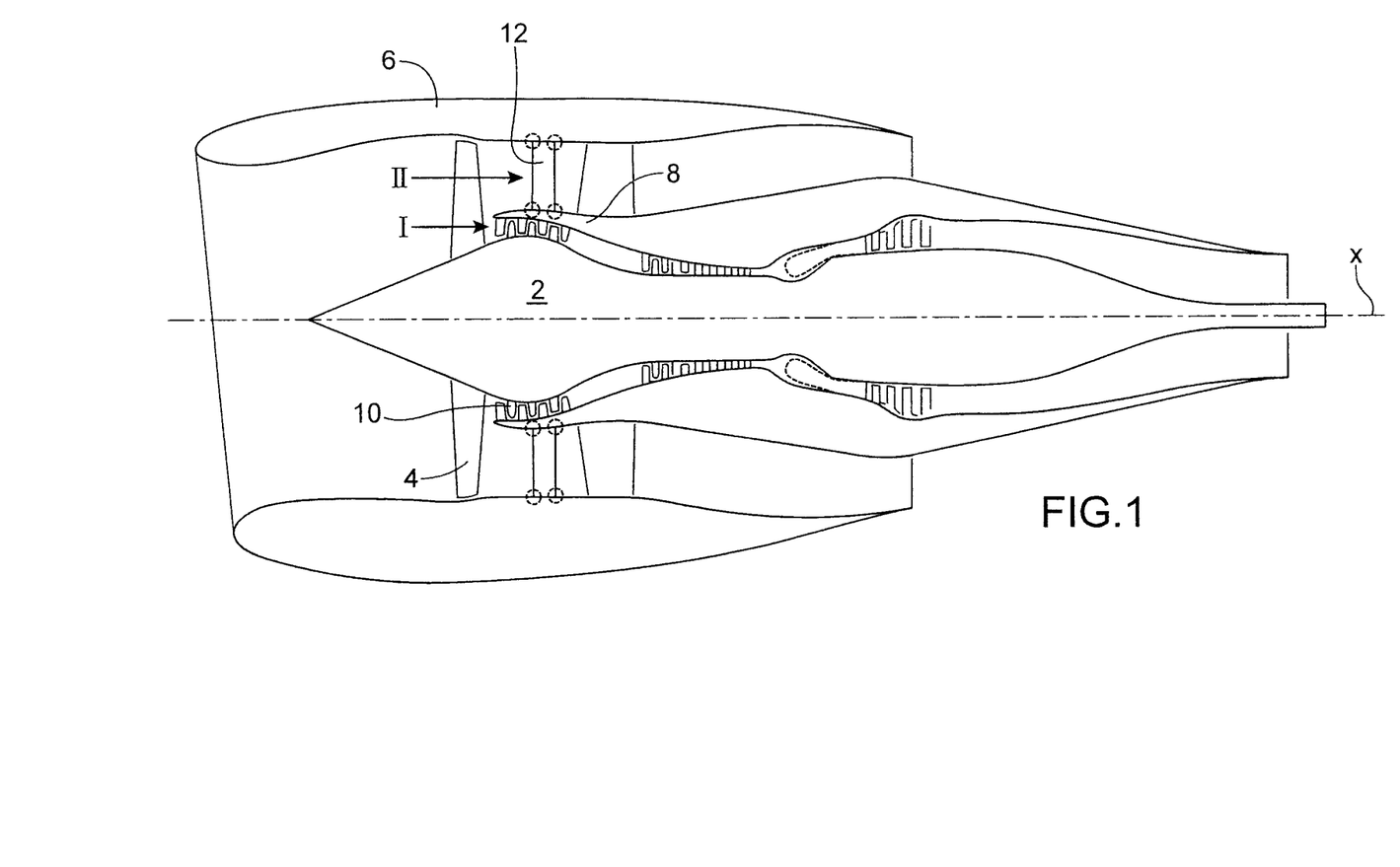
FIG. 1 is an overall view of a turbojet engine to which the present invention can be applied.

FIG. 1 shows an overall view of a dual-flow turbojet engine. It has a longitudinal axis X and comprises a central body 2 at the front of which a fan 4 is placed, said body being surrounded by an annular nacelle 6.

An annular inner hub 8 is placed around the central body 2 and inside the annular nacelle 6. Inside said dual-flow turbojet engine, the entering flow of air divides into a primary flow I, which passes through a low-pressure compressor 10 whereof the vanes are arranged between the main body 2 and the inner hub 8, and a secondary flow II, which passes between the inner hub 8 and the nacelle. The secondary flow II makes it possible to increase the thrust of the turbojet engine. An intermediate casing 12 is situated between the inner hub 8 and an outer shroud 14 forming the inner portion of the nacelle 6.

Figure 2:
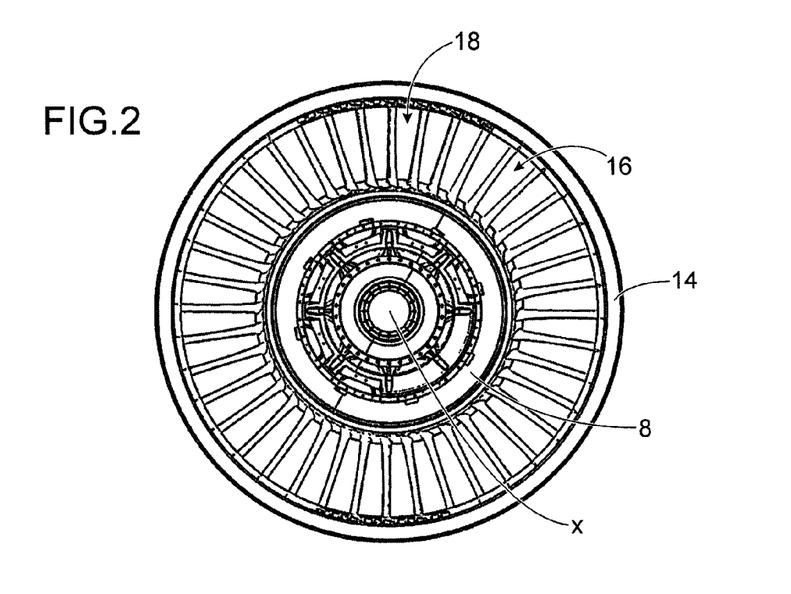
FIG. 2 is a front view of one embodiment of an intermediate casing according to the present invention mounted around an inner hub and surrounded by an outer shroud.

The intermediate casing 12, shown from the front in FIG. 2 and in perspective in FIG. 7, will now be described in detail. It has a longitudinal axis X' intended to be aligned with the axis of the turbojet engine. The intermediate casing comprises radial modules 16, 18 forming aerodynamic blades intended to rectify the second flow as well as structural arms intended to recover the traction-compression stresses during operation. These radial modules 16, 18 are distributed around the axis X'.

The radial modules are divided into two types; radial modules 16 of the first type are intended to recover traction-compression forces only, and radial modules 18 of the second type are intended to recover traction-compression forces and forces in terms of the suspension of the turbojet engine and the transmission of forces coming from the inner hub.

Radial modules of the second type are arranged at angular positions of twelve o'clock, i.e. at the suspensions, and six o'clock.

The radial modules of the first type 16 are arranged around the axis X' between the twelve o'clock and six o'clock and the six o'clock and twelve o'clock angular positions.

Figure 3:
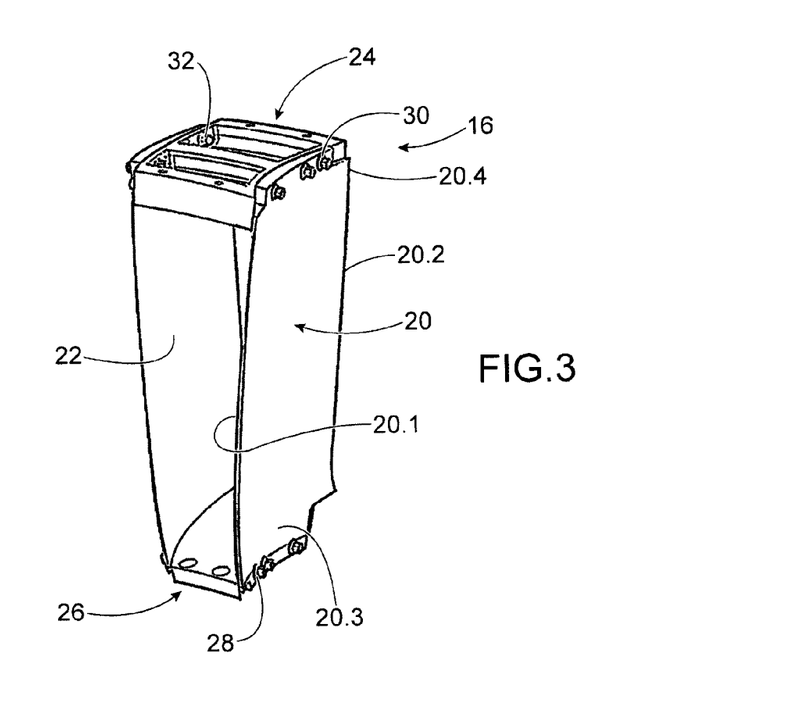
FIG. 3 is a perspective view of a module according to the present invention forming part of the casing of FIG. 2, FIGS. 4A and 4B are perspective views of isolated elements of the module of FIG. 3 according to the present invention.

FIG. 3 shows a detail of an embodiment of a radial module 16 of the first type.

A radial module of the first type 16 intended to bear the traction and compression forces comprises two substantially parallel blades 20, 22 made from a composite material connected by a radially outer platform 24 and by a radially inner platform 26.

The blades 20 and 22 being substantially identical, only the blade 20 will be described in detail.

The blade 20 comprises a leading edge 20.1, a trailing edge 20.2, a radially inner edge 20.3, and a radially outer edge 20.4. The radially outer edge 20.1 and the radially inner edge 20.3 of the blades have a curved profile, such that the module delimits an airstream, and performs a stationary guide vane function for the secondary flow.

The blade 20 is made from a composite material by weaving fibers in three dimensions.

The blade 20 can be hollow or solid.

Figure 4A:
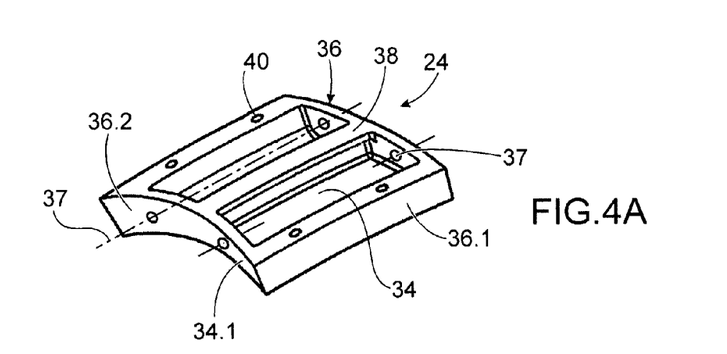
Figure 4B:
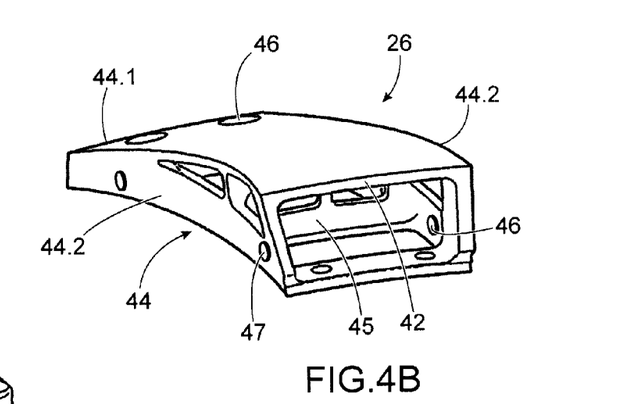

The radially inner edge 20.3 comprises bores 28 for fastening to the radially inner platform 26 (FIG. 4B).

The radially outer edge 20.4 comprises bores 30 for fixing to the radially outer platform 24 (FIG. 4A). In the illustrated example, there are bores 28, 30 distributed along each edge 20.3, 20.4.

The blades 20, 22 are fixed on the outer platform 24 at their radially outer edges using screw-nut assemblies 32, three assemblies 32 for each blade 20, 22 in the illustrated example.

Advantageously, the axis of the screws; is substantially orthogonal to the radial direction of the blades so that the screws are effectively under shearing stress due to the traction-compression forces undergone by the blades.

The radially outer platform 24 is advantageously made from a composite material, advantageously with fibers woven in three dimensions. The fibers are for example carbon fibers and/or glass fibers and/or Kevlar® fibers.

The resin is for example an epoxy resin.

The blades can also be made from fibers woven in three dimensions. The fibers are for example carbon fibers and/or glass fibers and/or Kevlar® fibers.

More particularly, the outer platform 24 is in the form of a box provided with a bottom 34, and lateral walls 36.

The bottom 34 comprises a face 34.1 oriented radially towards the inside of the casing and is intended to delimit, with the blades 20, 22, the aerodynamic channel.

The face 34.1 therefore has the required properties to perform this function in terms of surface condition.

The lateral walls 36 extend towards the outside of the casing. Two lateral walls are the walls 36.1 transverse to the axis X' and the other two walls 36.2 are longitudinal walls.

The walls 36.2 comprise bores 37 receiving the screws to secure the blades 20, 22.

The longitudinal walls 36.2 have outer faces configured so that the radially outer edges of the blades, which have a curved profile, come into substantially planar contact with the outer faces of the longitudinal walls 36.2.

In the illustrated example and advantageously, a stiffening rib 38 is provided between the two longitudinal walls.

Bores 40 are also provided in the transverse walls 36.1 emerging on their radially outer face to allow securing of the outer shroud.

The radially inner platform 26 also assumes the form of a box comprising a bottom 42, the radially outer face of which delimits the aerodynamic conduit, and lateral walls 44 extending radially inwards.

These walls 44 comprise two longitudinal walls 44.2 provided with bores 47 for fixing blades 20, 22 by their radially inner edges using screw-nut assemblies. In the illustrated example, the bottom has a profile in the form of a ramp reconstituting the stream at the hub 8. The transverse wall 44.1 on the leading edge side has a smaller height than the transverse wall 44.1 of the trailing edge side. In the illustrated example, the latter is added, which makes it possible to reduce the mass of the radially inner platform.

As shown in FIG. 4B, a transverse stiffening rib 45 is also provided.

Advantageously, the platforms are hollowed out and/or open to reduce the mass thereof.

As for the radially outer platform 24, the radially inner platform 26 is advantageously made from a composite material with fibers woven in three dimensions.

The radially inner platform also comprises two radial bores 46 for fixing thereof to the hub 8. It should be noted that after mounting of the platform on the hub using screws, the bores and the screw heads are covered with a material, of the elastomer type, to prevent the appearance of turbulence.

When the radial modules 16 are mounted on the hub 8, they are arranged angularly so that two consecutive blades laterally delimit airstreams with substantially the same width.

There are therefore streams V1 delimited by a single radial module 16, via its two vanes and its faces of the bottoms of the platforms 24, 26, and streams V2 delimited by two consecutive radial modules 16.

In the latter case, a stream is laterally delimited by a blade 20 of a radial module 16 and by a blade 22 of an adjacent radial module 16.

Figure 6A:
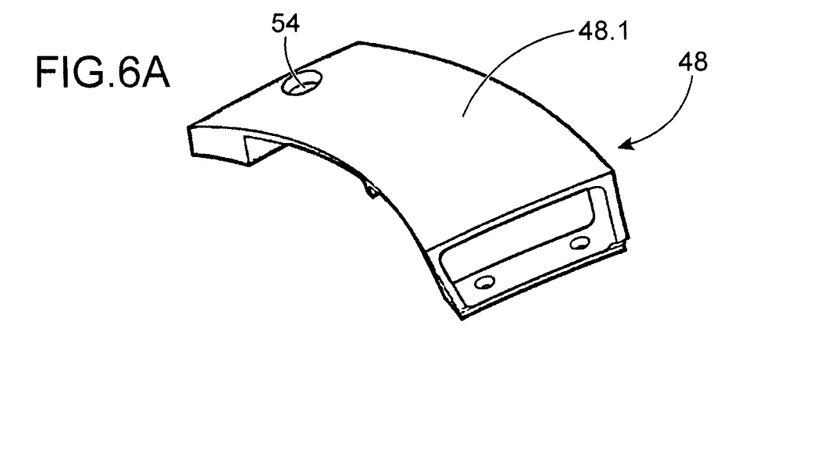
FIGS. 6A to 6C are perspective views of aerodynamic panels according to the present invention.
Figure 6B:
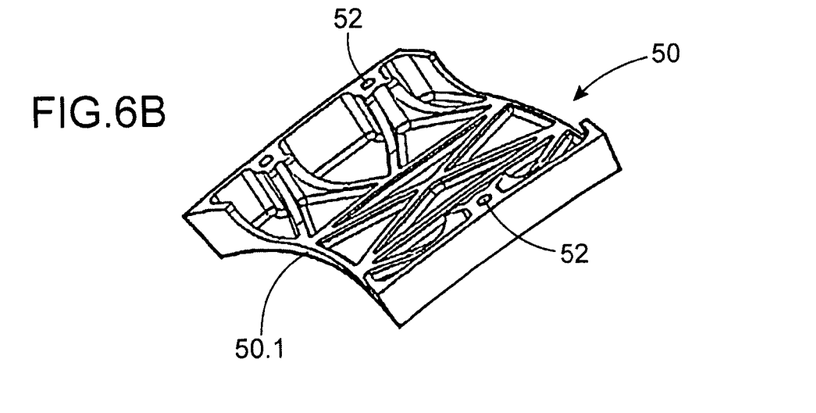

The casing also comprises radially inner 48 and radially outer 50 aerodynamic panels illustrated in FIGS. 6A and 6B, respectively, arranged angularly between two radial modules 16, in order to radially delimit the stream V2. The radially outer panels 50 comprise a smooth face 50.1 on the side of the stream V2 and means for fixing to the outer shroud on their opposite faces. In the illustrated example, the fixing means are formed by non-through bores 52 intended to receive a screw.

The radially inner aerodynamic panels 48 comprise a smooth face 48.1 on the stream V2 side and fixing means for fixing to the inner hub. In the illustrated example, these fixing means have been formed by a bore 54 emerging in the smooth face 48.1. Similarly to the radially inner platform 26, the face 48.1 has a profile in the form of a ramp reconstituting the stream at the hub 8.

The aerodynamic panels 48 cover the screw heads fixing the blades 20, 22 on the radially inner platform 26 and protruding radially.

The aerodynamic panels 48 and 50 are advantageously made from Kinel®.

The aerodynamic panels 48 and 50 comprise lateral edges configured to ensure quasi-continuous contact between the edges and the blades 20, 22.

Advantageously, the intermediate casing comprises, arranged in the angular position at 12 o'clock and 6 o'clock, radial modules 18 of the second type intended to recover the forces in terms of the suspension and to transmit the forces coming from the cores.

Figure 5:
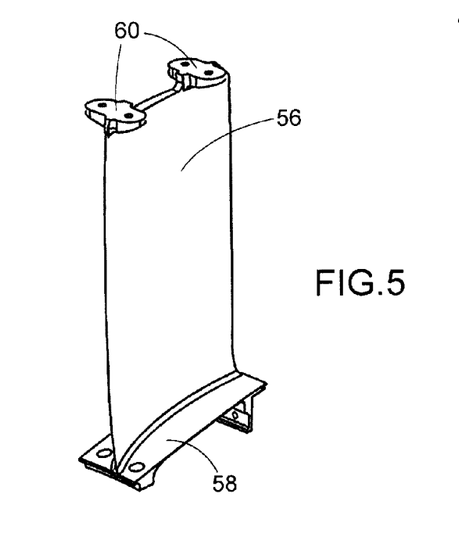
FIG. 5 is a perspective view of a module of a second type.

Such a module 18 is shown in FIG. 5; it comprises a blade 56, a platform 58 on the inner hub 8 side, and platforms 60 laterally protruding from the outer shroud side. The module 18 is made from a metal material, such as titanium.

The platform 58 comprises bores for the passage of the screws and fixing in the inner hub 8.

The platforms 60 comprise bores on the shroud side for screwing the screws.

Figure 6C:
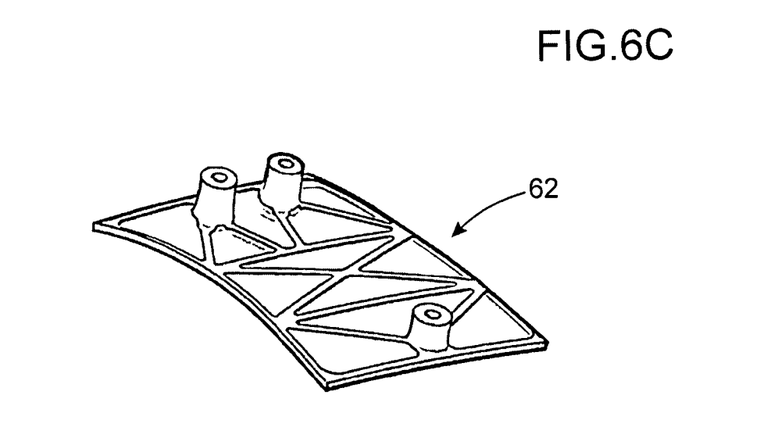

Aerodynamic panels 62, one of which is shown in FIG. 6C, are also provided between the modules 18 on the outer shroud side.

These can also, advantageously, be made from a composite material.

In the illustrated example, five modules 18 are arranged at twelve o'clock and three are arranged at six o'clock. It is understood that this number is not limiting and that more or fewer modules 18 can be positioned. Moreover, the number of modules 18 at twelve o'clock and at six o'clock can be identical.

Figure 7:
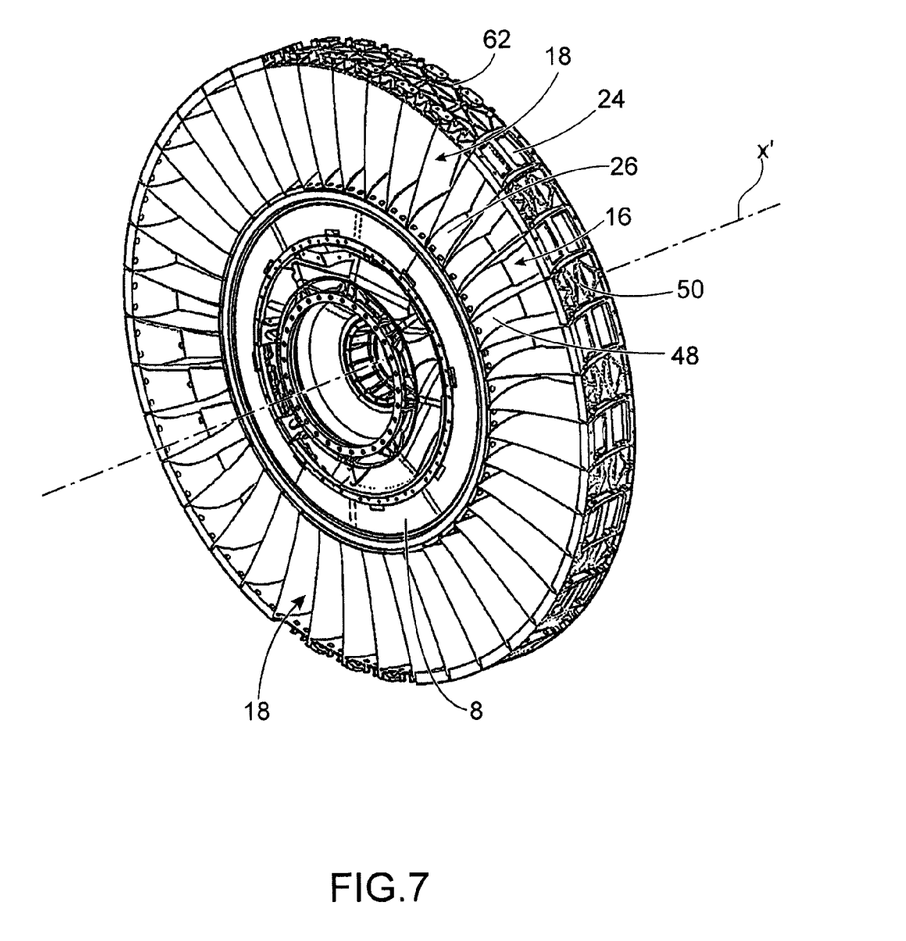
FIG. 7 is a perspective view of the casing of FIG. 2, the outer shroud being omitted.

FIG. 7 shows the outer aerodynamic panels assembled between the modules 16 and 18.

We will now explain the mounting of an intermediate casing.

Figure 8A:
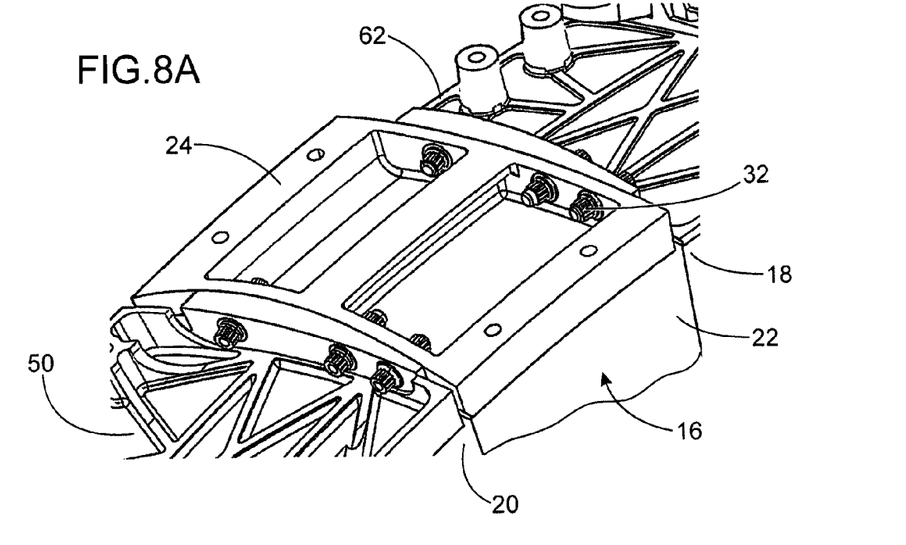
FIGS. 8A and 8B are detailed views of embodiments of the radially outer part and the radially inner part, respectively, of the casing of FIG. 7.

Beforehand, radial modules 16 are made by assembling two blades 20, 22 using a radially inner platform 26 and a radially outer platform 24 and screw-nut assemblies. The assembly of two blades 20, 22 on a radially outer platform 20 is shown in FIG. 8A using screw-nut assemblies.

Figure 8B:
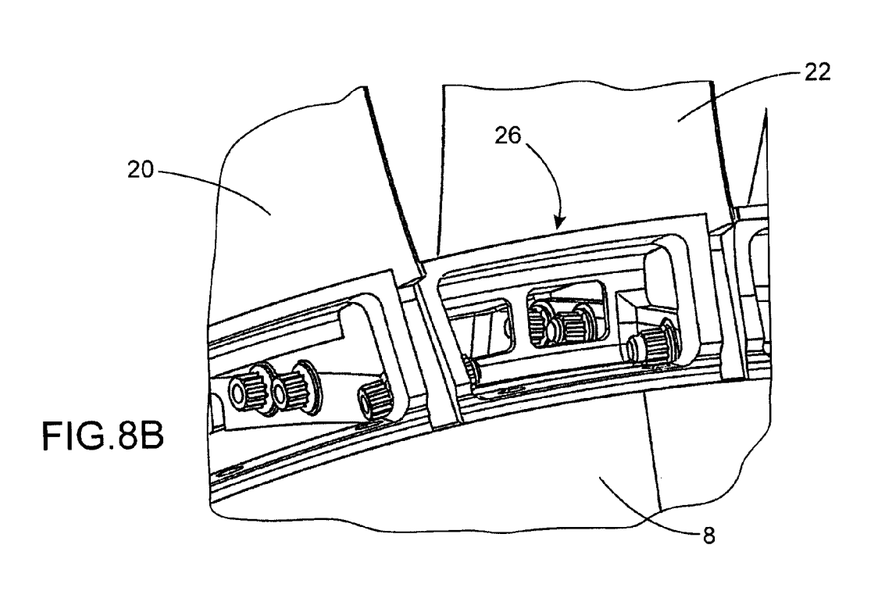

FIG. 8B shows the fixing of the blades 20, 22 on the radially inner platform 26. It should be noted that, in FIGS. 8A and 8B, the radial modules 16 are already on the inner hub 8.

In the illustrated example, 16 radial modules 16 are made. There are also five radial modules 18. In a subsequent step, the radial modules 18 are fixed on the hub 8 in angular position at 12 o'clock and 6 o'clock using screws through the bores. In the illustrated example, two screws are necessary to fix each platform 58 on the hub 8. The aerodynamic panels 62 are inserted between the platforms 60.

The radial modules 16 are then fixed on the inner hub 8, more particularly the radially inner platforms 26 are fixed on the inner hub 8 by screws.

The radial modules 16 are arranged angular on the inner hub 8 such that they delimit streams between them with a width substantially equal to the width delimited by two blades 20, 22 of a same radial module 16. Radially inner aerodynamic panels 48 are arranged between two radial modules 16, then fixed to the inner hub using screws.

Radially outer aerodynamic panels 50 are then arranged between two radial modules 16. The outer shroud is then mounted around the assembly thus formed and is fixed thereon using screws penetrating the aerodynamic panels 50, 62 and in the radially outer platforms 24 of the radial modules 16.

A stopper material is provided on the heads of the screws situated in the streams and around them, to reduce the risks of turbulence.

The intermediate casing shown in FIG. 7 is then obtained.

The casing has a reduced mass, since a majority of its components are made from a composite material whereof the density is lower than that of the metal materials generally used. The important use of composite materials is not done to the detriment of its mechanical characteristics, since the casing is able to recover the forces in terms of the suspension and to transmit the forces coming from the cores owing to the use of metal radial arms in localized zones.

Moreover, it is able to hold the traction-compression forces to which such a casing is generally subjected. Indeed, the composite materials in the form of woven fibers are adapted to holding such forces. Moreover, at the fastening between the blades and the platforms, it is the screws that recover these traction-compression forces; they are then under shearing stress, stresses they are able to hold with a sizing adapted to them.

Moreover, mounting the blades on the casing is made simpler, and replacing them is simplified. This can be done directly under the wing of the airplane, without having to take out the turbojet engine. To that end one need only remove the outer shroud, the aerodynamic panels 50 located on either side of the radial module 16 to be replaced, then remove the radially inner aerodynamic panels 48, the radial module can then be removed after removing the screws. Mounting a new radial module 16 is done by performing the above steps in the opposite order.

It is understood that the aerodynamic panels 48, 50, 62 are not necessarily made from a composite material and that they could be made from another material such that a metal material.

In that case, the mass savings will be lower than for a casing with aerodynamic panels made solely from composite materials, but the casing thus obtained would still be lighter than an intermediate casing of the prior art.

Advantageously, it is possible to provide for arranging, in the radially outer aerodynamic panels 24 and/or the radially inner aerodynamic panels 50, 62, a material capable of damping vibrations, e.g. a foam.

The invention claimed is:

1. A module for producing a turbomachine casing comprising:
   two blades each extending along a longitudinal axis, each blade each comprising a leading edge, a trailing edge, a radially inner edge and a radially outer edge, the radially outer and radially inner edges of the blades having a curved profile, said blades comprising bores for passage of screws,
   a radially inner platform mechanically connecting the radially inner edges of the two blades, and
   a radially outer platform mechanically connecting the radially outer edges of the two blades,
   wherein the two blades and the radially outer and inner platforms delimit a flow stream,
   wherein the two blades and the radially outer platform are made from a composite material, and
   wherein the two blades are fixed on the radially outer and inner platforms using screw-nut assemblies mounted in the bores of the blades.

2. The module according to claim 1, wherein an axis of the screws is substantially orthogonal to the longitudinal axes of the blades.

3. The module according to claim 1, wherein the blades and the radially outer platform comprise fibers woven in three dimensions.

4. The module according to claim 3, wherein the fibers of the blades and the fibers of the radially outer platform are the same.

5. A platform for making a module according to claim 1, intended to connect two blades at radially outer edges or radially inner edges thereof, said edges being fixed on the platform by screw-nut assemblies, said platform comprising two opposite lateral edges intended to be in contact with faces of the blades comprising bores intended to be passed through by the screws, said lateral edges having a curved profile corresponding to a curved profile of the blades, said platform being made from a composite material.

6. The platform according to claim 5, wherein the platform is a radially inner platform comprising a radially outer face which recreates a flow stream.

7. A structure comprising:
   a plurality of modules arranged angularly on an inner hub, each module comprising:
   two blades each extending along a longitudinal axis, each blade each comprising a leading edge, a trailing edge, a radially inner edge and a radially outer edge, the radially outer and radially inner edges of the blades having a curved profile, said blades comprising bores for the passage of screws,
   a radially inner platform mechanically connecting the radially inner edges of the two blades, and
   a radially outer platform mechanically connecting the radially outer edges of the two blades,
   wherein the two blades and the radially outer and inner platforms delimit a flow stream,
   wherein the two blades and the radially outer platform are made from a composite material, and
   wherein the two blades are fixed on the radially outer and inner platforms using screw-nut assemblies in the bores of the blades.

8. The structure according to claim 7, wherein said modules are arranged relative to each other so that a distance between two blades of two adjacent modules is substantially equal to a distance between two blades of a same module.

9. The structure according to claim 7, further comprising a first group of at least one metal vane in angular position at twelve o'clock and a second group of at least one metal vane in angular position at six o'clock, the modules being arranged between the first and second groups of metal vanes.

10. The structure according to claim 9, further comprising:
    first radially inner aerodynamic panels and first radially outer aerodynamic panels arranged between each pair of modules so as to recreate flow streams, and
    second aerodynamic panels arranged between each pair of metal vanes between two radially outer platforms.

11. The structure according to claim 7, further comprising radially inner aerodynamic panels and radially outer aerodynamic panels arranged between each pair of modules so as to recreate the flow streams.

12. A turbomachine comprising a structure according to claim 7.

13. The turbomachine according to claim 12, forming a dual-flow turbojet engine, wherein the structure forms an intermediate casing fixed on an inner hub and on an outer shroud.

* * * * *